United States Patent [19]
Pitrat

[11] 4,151,757
[45] May 1, 1979

[54] ELECTRIC DEVICE FOR CONTROLLING THE POSITION OF A MEMBER SUCH AS THE EXTERNAL REARVIEW MIRROR MEMBER OF AN AUTOMOTIVE-VEHICLE

[75] Inventor: Alain Pitrat, Mours St. Eusebe, France

[73] Assignee: Societe Anonyme des Equipements S.E.I.M. Specialites Electriques et Industrielles et Mechaniques, France

[21] Appl. No.: 883,233

[22] Filed: Mar. 3, 1978

[30] Foreign Application Priority Data

Mar. 24, 1977 [FR] France ............................... 77 08815

[51] Int. Cl.² ........................... G02B 5/08; G02B 5/28
[52] U.S. Cl. .............................. 74/501 M; 296/84 B; 350/289; 350/307; 248/476
[58] Field of Search ...................... 296/84 B; 248/476; 75/501 M; 350/289, 307

[56] References Cited
U.S. PATENT DOCUMENTS

| | | | |
|---|---|---|---|
| 3,961,543 | 6/1976 | Morgenstern | 74/501 M |
| 4,080,049 | 3/1978 | Oskam | 350/289 |

*Primary Examiner*—Philip Goodman
*Attorney, Agent, or Firm*—Steinberg & Blake

[57] ABSTRACT

The invention relates to a device for controlling the position of a member jointed to a support such as an automotive-vehicle external rearview mirror member movable about two axes substantially perpendicular to one another defined in the plane of the mirror member by, on the one hand, a common main rotary joint and, on the other hand, by two secondary rotary joints, respectively. Two locking means each associated with an axis of rotation are selectively unlockable to ensure the rotation of said mirror member about either axis of rotation under the single control of an electro-magnet.

8 Claims, 3 Drawing Figures

ELECTRIC DEVICE FOR CONTROLLING THE POSITION OF A MEMBER SUCH AS THE EXTERNAL REARVIEW MIRROR MEMBER OF AN AUTOMOTIVE-VEHICLE

The present invention relates generally to a device for controlling the position of a member, e.g. rotatably jointed to a support, and has more particularly for its object an electric device for controlling the position of the rearview mirror member of an automative vehicle.

The control of the position of an external rearview member of an automotive vehicle e.g. from the fascia board, is not in itself a novel feature. Electric control devices have gradually taken the place of entirely mechanical devices. In order to allow for various factors such as for example the loaded weight of the vehicle or the driver's morphology, it is necessary to provide a rearview member that is rotatable in any direction. To this end, the rearview member is so mounted as to be rotatable about two mutually perpendicular axes and is selectively actuated about those two axes by one or two electric motors, depending of the type of known device considered.

In such arrangements, however, an assembly of mechanically interconnected elements has to be interposed between the motor and the mirror member, so that a relatively great number of such elements must be used and a rather complex mirror member support has to be provided to accomodate all such elements, thus resulting in relatively exspensive manufacturing and difficult use.

The purpose of the present invention is to obviate the above drawbacks by providing an electric control device requiring no special mechanical connection, except, of course, for the rotary joints of the mirror member necessary to ensure its rotation in at least two perpendicular directions.

To this end, the invention provides a device for controlling position of a member rotatably jointed to a support, such as an automative vehicle external mirror member selectively movable about two axes substantially perpendicular to one another defined in the plane of the mirror member by, on the one hand, a main rotary joint, and, on the other hand, by two secondary rotary joints, respectively, characterized in that it comprises actuating means such as an electro-magnet and two locking means each associated with a said axis of rotation and selectively unlockable to ensure the rotation of the said mirror member about either axis of rotation.

According to another characterizing feature of the invention, the actuating means is constituted by the plunger or movable core of an electro-magnet, one end of which is connected through a rotary joint with the said mirror member and whose other end is permanently acted upon by a spring.

According to another characterizing feature of the invention, each locking means is constituted by two braking shoes, one of which is stationary and the other is actuated by an electro-magnet.

Other advantages, characterizing featurds and details will appear more clearly as the following explanatory description proceeds with reference to the appended drawings given solely by way of example and wherein.

Figure 1:
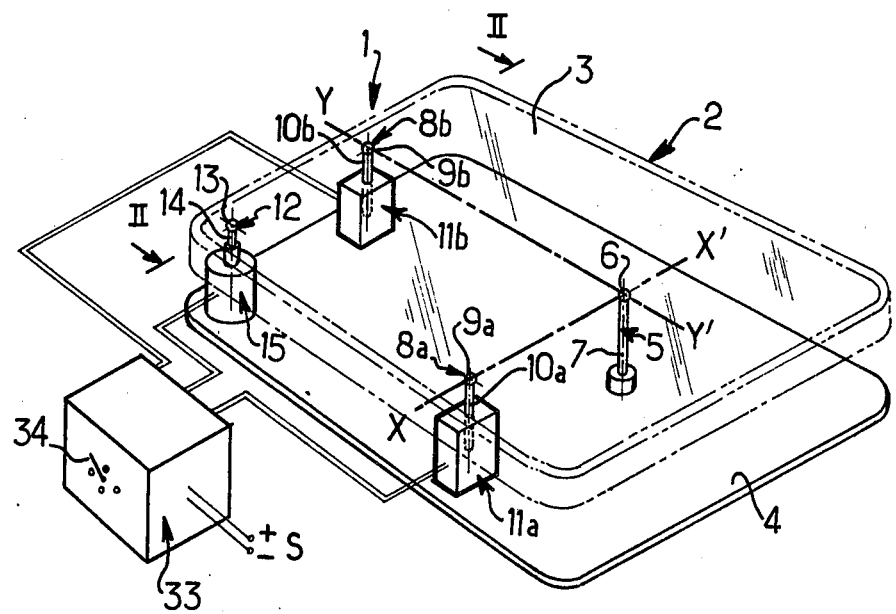
FIG. 1 is a partial perspective view of a control device according to the invention.

Referring to FIG. 1, there is diagrammatically shown an electric control device 1 for an external rearview mirror member 2 whose mirror 3 is rotatably jointed to a stationary support 4 itself secured to the body of the vehicle.

More precisely, the mirror 3 of the mirror member 2 is rotatably jointed to the support 4 by a main rotary joint 5 comprising a joint ball 6 supported at the end of the stationary stem 7 substantially perpendicular to the plane of the support 4 and whose other end is secured to the support, by two secondary rotary joints 8a, 8b each comprising a joint ball 9a, 9b supported at the end of a stem 10a, 10b substantially perpendicular to the plane of the support 4 and co-operating with a locking means 11a, 11b which either allows or prevents axial displacement of each stem 10a, 10b, by a rotary joint 12 associated with the actuating means of the mirror 3 of the mirror member 2, comprising a joint ball 13 secured to or integral with the plunger or movable core 14 of an electro-magnet 15 secured to the support 4.

As can be observed, the main rotary joint 6 is located for example towards the central portion of mirror 3, the rotary joint 12 of the actuating means is located towards a corner of mirror 3 of substantially rectangular shape, and the two secondary rotary joints 8a and 8b substantially define with the two other rotary joints a right-angled quadrilateral.

The two axes of rotation X X', Y Y' of the mirror member are defined by the axes connecting the main rotary joint 6 to the two secondary rotary joint 8a, 8b, which axes are substantially perpendicular to one another.

Figure 2:
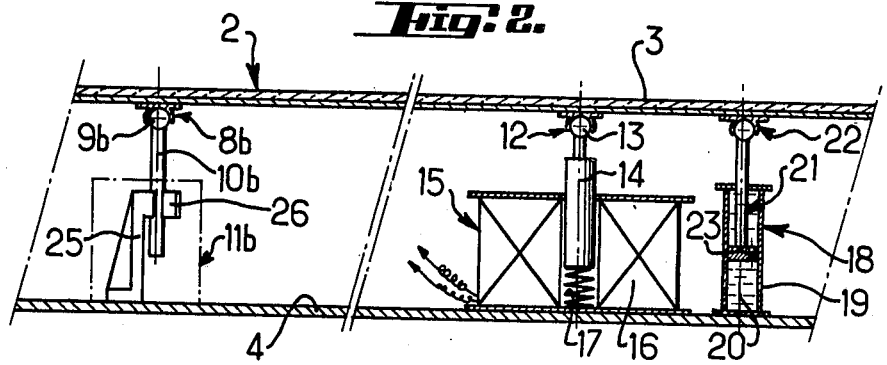
FIG. 2 is an enlarged sectional view upon the line II—II of FIG. 1, showing the details of the actuating means of the control device of FIG. 1.

Referring to FIG. 2, there will now be described in detail the electro-magnet 15 which is the actuating means ensuring the rotation of the mirror member about the axes X X' and Y Y'. The plunger or movable core 14 of the soft or mild magnetic material is movable within the electro-magnet coil 16 and is acted upon at its end located within the coil by a resilient element such as a spring 17. When the electro-magnet 15 is not energized, the plunger 14 tends to move out of the coil 16 thus moving the mirror member 2 from the support 4 through the medium of the rotary joint 12 provided at the other end of the plunger. On the contrary, when the electro-magnet is not energized, the plunger 14 moves into the coil 16 against the action of the spring 17.

To ensure a controlled and relatively slow rotation of the mirror member, a damping means, e.g. of a hydraulic type, is associated with the plunger 14.

In FIG. 2 such a damping means 18 is shown to be constituted by a cylindrical pipe section 19 secured to the support 4 and containing a viscous liquid 20. A piston member 21 is engaged in the pipe section 19 and exteriorly connected by a ball joint 22 to the mirror 3 of the mirror member 2. The piston portion of the piston member 21 is provided with openings 23 allowing passage of the viscous liquid 20 during the to and fro displacement of the said piston portion. The damping device 18 is not shown in FIG. 1. In an alternative arrangement, there can be provided a damping device directly associated with the plunger 14 of the control electro-magnet 15.

Figure 3:
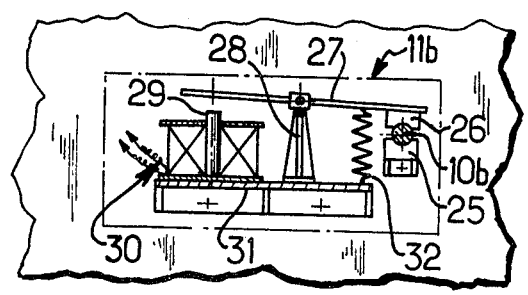
FIG. 3 is a partial top view of the device of FIG. 2, showing the details of a locking means according to the invention.

In FIG. 3 is shown in detail the locking means 11b associated with the secondary joint 9b. This locking means, in the form of a braking arrangement, comprises a stationary shoe 25 secured to the support 4 and a movable shoe 26 adapted to selectively engage the movable stem 10b supporting the secondary rotary joint 9b. The movable shoe 26 is supported at the end of a strip or bar 27 pivotally mounted towards its central portion on a post 28 secured to the support 4. The other end of the bar 27 is adapted to co-operate with a stationary core 29 of an electro-magnet 30 secured to the support 4 through the medium of an intermediate support 31. An extension spring 32 mounted between the bar 27 and the intermediate support 31 allows the movable shoe 26 to be held applied to the stem 10b when the control electro-magnet 30 is not energized, thus preventing the stem 10b from moving.

Reverting to FIG. 1, there is diagrammatically shown the control box 33 located within the interior space of the vehicle and comprising a lever 34 capable of assuming four control positions. The control box is connected on the one hand to a supply source S, such as the vehicle battery, and, on the other hand, to the coil 16 of the control electro-magnet 15 and to the coils of the electro-magnets 30 of the locking means.

The operation of the control device according to the invention will now be described with reference to the various Figures.

In a given position of the mirror member 2 none of the electro-magnets is energized, so the plunger 14 of the control electro-magnet 15 is only urged by the spring 17 which therefore tends to displace the mirror member. This displacement, however, is prevented by the locking means 11a, 11b holding the associated stems 10a, 10b through the medium of the springs 32.

Assuming, now, that it is desired to change the position of the mirror member 2 by causing it to rotate about the axis X X'.

To do this, the control lever 34 is placed in a position which energizes either the electro-magnet 30 of the locking means 11b only or the electro-magnet 30 of the locking member 11b and the control electro-magnet 15 to obtain both of the possible directions of rotation about the axis X X'. In the first case where only the electro-magnet 30 of the locking means 11b is energized, the movable shoe 26 is disengaged from the associated stem 10b, thus freeing the latter as a result of the attraction of the bar 27 towards the electro-magnet stationary core 29. Thus, under the action of the spring 17 associated with the plunger 14 of the actuating means 15, the stem 10b of the locking means 11b moves in the same direction as the plunger 14, thus causing the mirror member to rotate about the axis X X'.

The second case, the coil 16 of the actuating means 15 is also fed, thus causing the plunger 14 to move into the coil under the action of a force greater than that of the spring and therefore ensuring the rotation of the mirror member 2 in a contrary direction to the one obtained above.

The other two positions of the control lever 34 similarly ensure the rotation of the mirror member about the axis Y Y', but in this case the stem 10b of the locking means 11b remains locked whereas the stem 10b of the locking means 11a is free to move in the direction determined by the electro-magnet 15 depending on whether it is energized or not.

From the foregoing it is apparent that the electric control device according to the invention is particularly simple and requires no expensive control means, for it has no electric motor but merely electro-magnets. The device is original in that the mirror member is subjected all the time to forces which tend to displace it but are annulled by two locking members which are selectively unlockable to allow for rotation of the mirror member about a given axis. Such a device has the advantage of dispensing with the mechanical connections that are presently used in this kind of devices.

In the example illustrated, the various control means have been considered to include elements of mild or soft magnetic material, but use can be made, as well, of elements of hard magnetic material without changing the operating principle of the device described.

In the foregoing there has been described the control of a rearview mirror member in the field of the automotive industry, but of course such a device can be used in other branches of the industry.

Of course the invention is by no means limited to the form of embodiment described and illustrated solely by way of example. In particular, it comprises all means constituting technical equivalents to the means described as well as their combinations should the latter be carried out according to its gist and used within the scope of the following claims.

What is claimed is:

1. A device for controlling the position of a member rotatably jointed to a support, such as an automotive-vehicle external rearview mirror member movable by an actuating means such as a control electro-magnet about two axes substantially perpendicular to one another defined in the plane of the mirror member by, on the one hand, a common main rotary joint and, on the other hand, by two secondary rotary joints, respectively, wherein said device comprises two locking means each associated with a said axis of rotation and selectively unlockable to ensure the rotation of the said mirror member about either axis of rotation under the single control of the said electro-magnet.

2. A device according to claim 1, wherein the said control electro-magnet comprises a plunger whose end is connected to the said mirror member through a rotary joint and whose other end is permanently acted upon by a resilient element such as a spring.

3. A device according to claim 2, wherein the said main rotary joint is constituted by a ball joint connected with the mirror member and mounted at the end of a stationary stem secured at its other end to the said support.

4. A device according to claim 1, wherein each secondary rotary joint is constituted by a ball joint connected with the mirror member and provided at the end of an axially movable stem co-operating with the associated locking means.

5. A device according to claim 4, wherein each said locking means is constituted by two braking shoes mounted substantially on either side of the associated movable stem, one of the said shoes being stationary whereas the other shoe is movable and controlled by an actuating means such as an electro-magnet.

6. A device according to claim 5, wherein the said movable shoe is attached to a pivotally mounted bar or strip whose end co-operates with the stationary core of the associated electro-magnet so that when the latter is energized the said locking member is unlocked thus allowing the rotation of the mirror member about the axis of rotation associated with the said locking means.

7. A device according to claim 6, wherein the said plunger of the electro-magnet of the control means is associated with damping means e.g. of a hydraulic type, so as to slow down the movement of the said plunger.

8. A method of control of the position of a member such as an automotive-vehicle external rearview mirror member selectively movable about two axes substantially perpendicular to one another defined in the plane of the said mirror member by a main rotary joint and two secondary rotary joints, and controlled by an actuating means itself connected to the mirror member through a rotary joint, wherein said method consists in permanently subjecting the said mirror member, through the medium of the said actuating means, to forces tending to displace the said mirror member, and in providing two locking means each associated with a said axis of rotation and opposing the displacement of the said mirror member, the said locking means being selectively unlockable to allow the rotation of the said mirror member about the said two axes.

* * * * *